(12) United States Patent
Feeley et al.

(10) Patent No.: US 11,480,072 B2
(45) Date of Patent: *Oct. 25, 2022

(54) STATOR AND DUCT RING STRUCTURAL FITTINGS

(71) Applicant: Bell Textron Inc., Fort Worth, TX (US)

(72) Inventors: Elizabeth Feeley, Dallas, TX (US); Karl Schroeder, Southlake, TX (US); Joseph Richard Carpenter, Jr., Kennedale, TX (US)

(73) Assignee: Textron Innovations Inc., Providence, RI (US)

( * ) Notice: Subject to any disclaimer, the term of this patent is extended or adjusted under 35 U.S.C. 154(b) by 215 days.

This patent is subject to a terminal disclaimer.

(21) Appl. No.: 16/732,094

(22) Filed: Dec. 31, 2019

(65) Prior Publication Data

US 2021/0199022 A1 Jul. 1, 2021

(51) Int. Cl.
*F01D 25/24* (2006.01)
*B64C 11/00* (2006.01)
(Continued)

(52) U.S. Cl.
CPC .......... *F01D 25/24* (2013.01); *B64C 11/001* (2013.01); *B64C 27/52* (2013.01);
(Continued)

(58) Field of Classification Search
CPC ....... F01D 25/24; B64C 11/001; B64C 27/52; B64C 29/0033; B64C 29/02; B64C 29/545; B64C 2201/021; B64C 2201/088; B64C 2201/104; B64C 2201/141; B64C 2201/162; F04D 29/545
(Continued)

(56) References Cited

U.S. PATENT DOCUMENTS 2,337,861 A 12/1943 Adamtchik
2,473,329 A 6/1949 Candler
(Continued)

FOREIGN PATENT DOCUMENTS

BE 457491 A 10/1944

OTHER PUBLICATIONS

European Exam Report in related European Patent Application No. 20165683.2 dated Jun. 9, 2021, 5 pages.
(Continued)

*Primary Examiner* — Michael Lebentritt
*Assistant Examiner* — Justin A Pruitt
(74) *Attorney, Agent, or Firm* — Lightfoot & Alford PLLC

(57) ABSTRACT

A duct for a ducted-rotor aircraft includes a hub, a duct ring, and a plurality of stators that extend outward from the hub. The duct ring defines a trailing edge. The duct includes one or more fittings, such as a system of fittings. Each fitting has a body that defines a first attachment interface that is configured to couple to structure of the duct ring and a second attachment interface that is configured to couple to one of the plurality of stators. The first and second attachment interfaces are spaced from each other such that when the fittings are coupled to the duct ring and the plurality of stators, all or substantially all of each of the plurality of stators are located aft of the trailing edge of the duct ring.

13 Claims, 10 Drawing Sheets

(51) Int. Cl.
   *B64C 27/52*   (2006.01)
   *F04D 29/54*   (2006.01)
   *B64C 29/00*   (2006.01)
(52) U.S. Cl.
   CPC ........ *B64C 29/0033* (2013.01); *F04D 29/545* (2013.01); *B64C 2201/162* (2013.01)
(58) Field of Classification Search
   USPC ........................................................ 416/147
   See application file for complete search history.

(56) References Cited

U.S. PATENT DOCUMENTS

| | | | |
|---|---|---|---|
| 3,058,693 A | 10/1962 | Doak | |
| 4,394,111 A * | 7/1983 | Wiese | F24F 13/20 |
| | | | 165/122 |
| 4,613,097 A | 9/1986 | Jordan | |
| 6,443,714 B1 * | 9/2002 | Hollenbeck | F04D 25/08 |
| | | | 417/423.1 |
| 6,638,037 B2 * | 10/2003 | Grant | F04D 29/646 |
| | | | 248/674 |
| D726,897 S * | 4/2015 | Hatz | D23/411 |
| 9,284,058 B2 * | 3/2016 | Wang | B64C 29/0033 |
| D894,790 S * | 9/2020 | Chen | D12/16.1 |
| 11,148,800 B2 * | 10/2021 | Hong | B64C 39/04 |
| 2013/0026304 A1 * | 1/2013 | Wang | B64C 29/0033 |
| | | | 244/7 R |

OTHER PUBLICATIONS

European Exam Report in related European Patent Application No. 20165683.2 dated May 21, 2021, 4 pages.
European Exam Report in related European Patent Application No. 20165683.2 dated Jan. 21, 2022, 5 pages.

* cited by examiner

STATOR AND DUCT RING STRUCTURAL FITTINGS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Ducted-rotor aircraft have at least one ducted rotor for providing lift and propulsion forces. Each ducted rotor typically has internal structure that supports a motor of the aircraft and an aerodynamic exterior skin.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

It is desirable to minimize the number of separate components that make up the structure of a ducted-rotor aircraft, not only to limit the weight of the aircraft, but further to limit the number of joints that might be stressed during operation of the aircraft. Structural components are disclosed herein for use in aircraft such as ducted-rotor aircraft.

Figure 1:
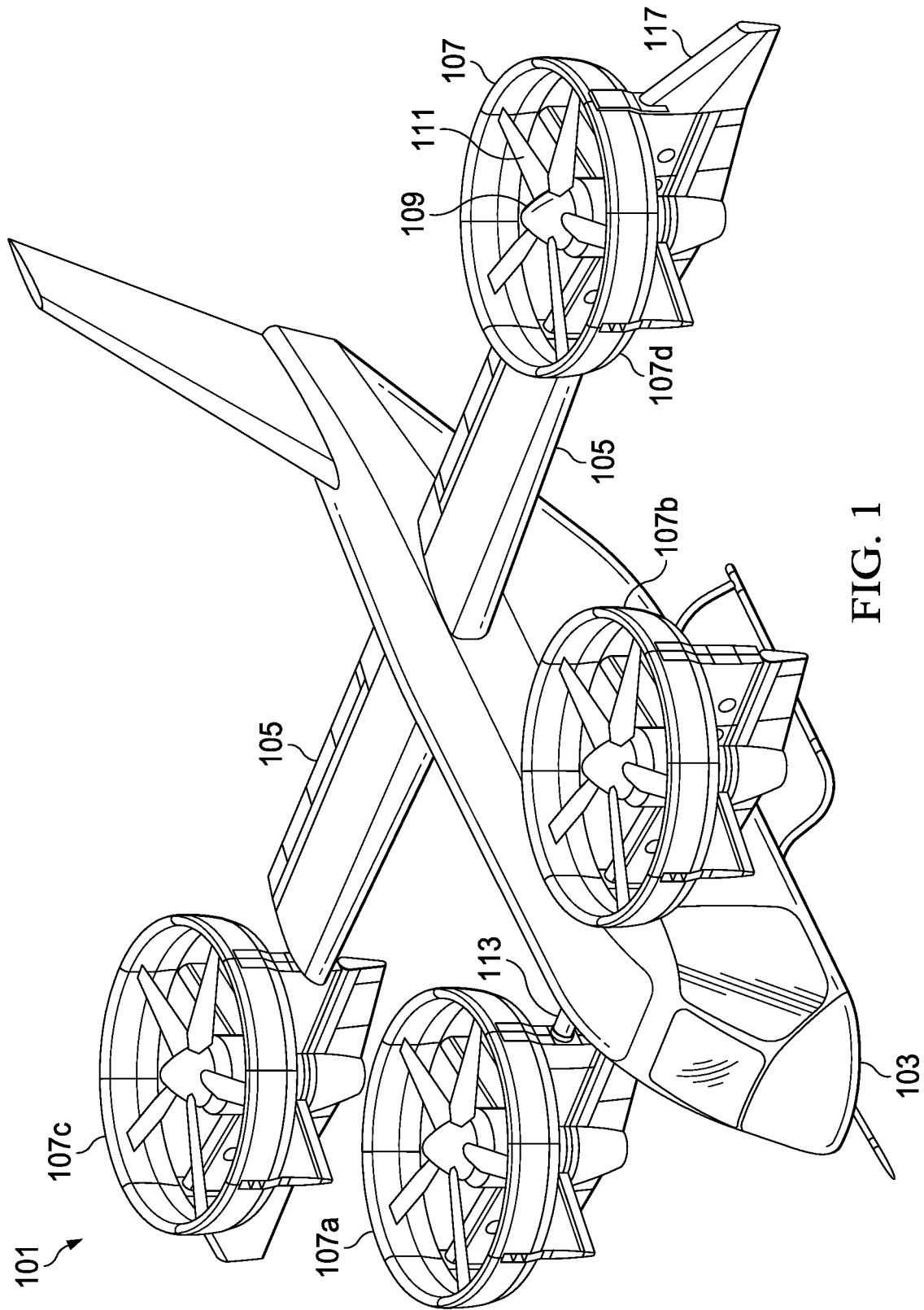
FIG. 1 is an oblique view of an aircraft with ducted rotors, with the ducted rotors configured for the aircraft to operate in a helicopter mode.
Figure 2:
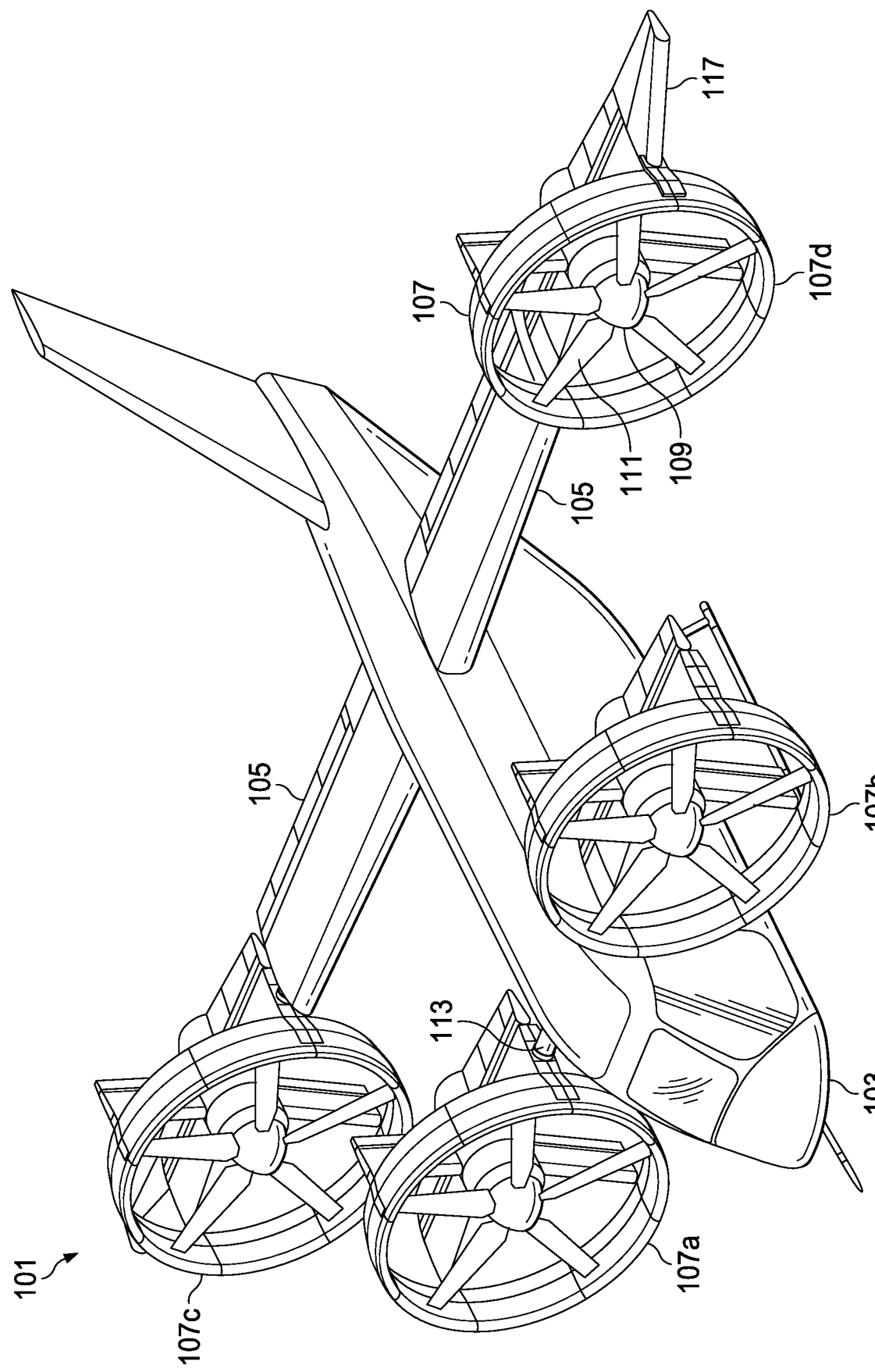
FIG. 2 is an oblique view the aircraft depicted in FIG. 1, with the ducted rotors configured for the aircraft to operate in an airplane mode.

FIGS. 1 and 2 are oblique views of a ducted-rotor aircraft 101. Aircraft 101 comprises a fuselage 103 with a fixed wing 105 that extends therefrom and a plurality of rotatable ducts 107. Each duct 107 houses a power plant for driving an attached rotor 109 in rotation. Each rotor 109 has a plurality of blades 111 configured to rotate within ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight.

Figure 3:
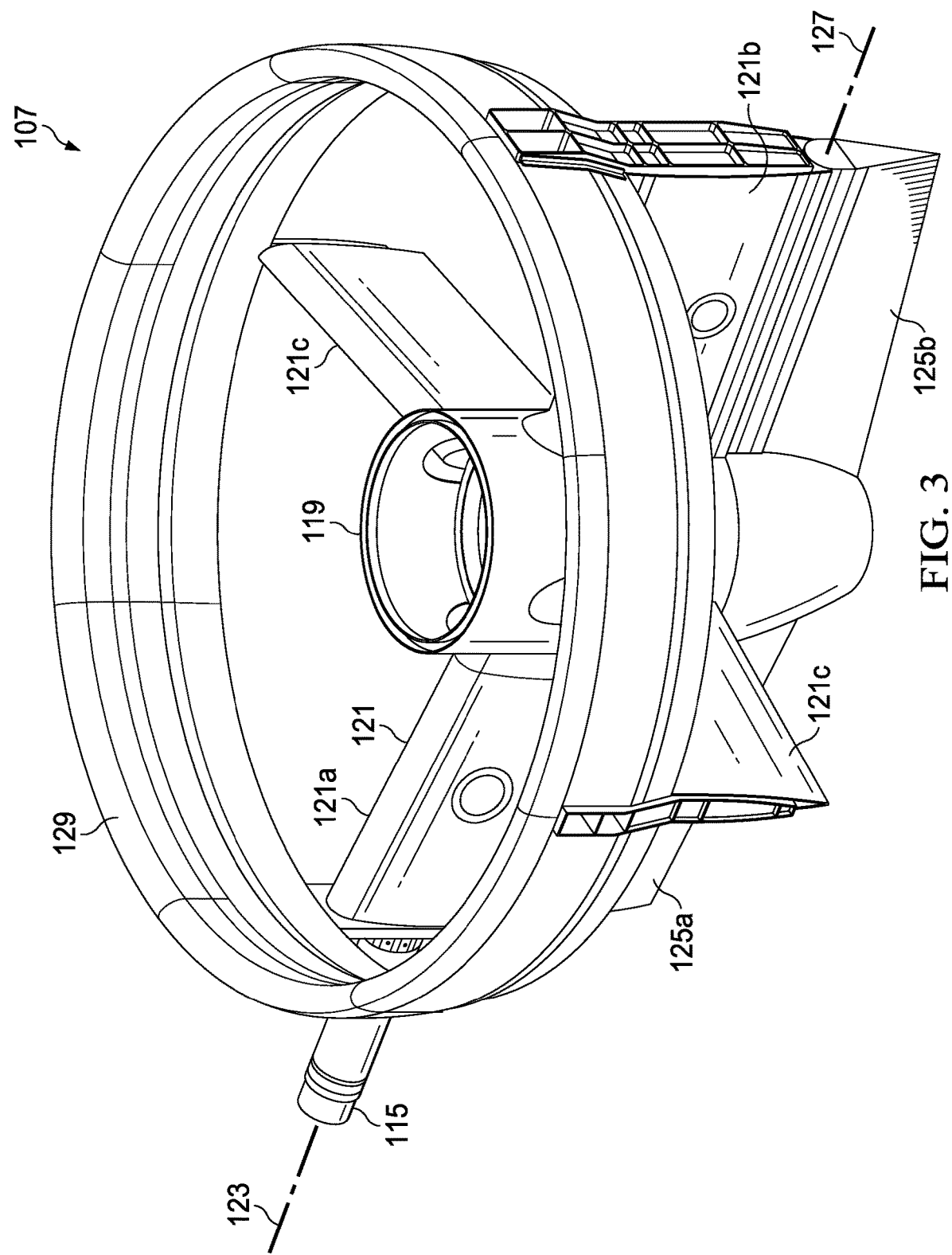
FIG. 3 is an oblique view of a duct of the aircraft depicted in FIG. 1.

In this embodiment, aircraft 101 is configured with four ducts 107, including two ducts 107a and 107b that form a forward pair of ducts and two ducts 107c and 107d that form an aft pair of ducts. Each duct 107 is rotatably coupled to fuselage 103 of aircraft 101 via a spindle. Ducts 107a and 107b are coupled directly to fuselage 103 by a first spindle 113. Ducts 107c and 107d are each independently coupled to a corresponding end of wing 105 via a respective spindle 115 (e.g., as seen in FIG. 3). As shown, each of ducts 107c and 107d each include a winglet 117 that is coupled thereto. It should be appreciated that aircraft 101 is not limited to the illustrated configuration having four ducts 107, and that aircraft 101 may alternatively be implemented with more or fewer ducts 107.

FIG. 3 is an oblique view of a duct 107 of aircraft 101. Duct 107 is depicted in FIG. 3 without rotor 109. Duct 107 includes a central hub 119 that is configured to support and house a rotor 109 and/or other components. Duct 107 further includes a plurality of stators 121 that extend outwardly from the hub 119. In this embodiment, duct 107 includes four stators 121 that extend radially outward from hub 119. More specifically, duct 107 has two primary stators that include an inboard primary stator 121a and an outboard primary stator 121b. Inboard primary stator 121a is configured to be coupled to a corresponding spindle, such as spindle 113 or spindle 115. Each duct 107 is rotatable about a spindle axis 123 that is defined by spindle 113 or spindle 115. Duct 107 also has two secondary stators 121c. Primary inboard and outboard stators 121a, 121b respectively are configured to carry a larger proportion of the load of duct 107 back to fuselage 103 than are secondary stators 121c. As shown, inboard primary stator 121a and outboard primary stator 121b are longitudinally aligned relative to each other on opposed sides of hub 119 and secondary stators 121c are longitudinally aligned relative to each other on opposed sides of hub 119 and aligned perpendicularly to inboard primary stator 121a and outboard primary stator 121b. In this regard, stators 121 are equally spaced about hub 119. It should be appreciated that duct 107 may be alternatively configured with more or fewer stators 121. It should further be appreciated that duct 107 may be alternatively configured with different spacing of stators 121 about hub 119.

Duct 107 further includes an inboard control vane 125a and an outboard control vane 125b, which are pivotally attached to inboard primary stator 121a and outboard primary stator 121b, respectively. Inboard control vane 125a and outboard control vane 125b are pivotable about a vane axis 127 that extends parallel to spindle axis 123. In this embodiment, inboard control vane 125a and outboard control vane 125b are configured to rotate together to facilitate yaw control, changes of direction, turning, etc. during flight of aircraft 101. It should be appreciated, however, that inboard control vane 125a and outboard control vane 125b may alternatively be configured to rotate independently from one another. It should further be appreciated that duct 107 is not limited to the illustrated configuration of inboard control vane 125a and outboard control vane 125b. For example, duct 107 may alternatively be configured with more or fewer control vanes, such as a single control vane that defines a continuous control surface. Duct 107 may include one or more sections of skin 129 that form an aerodynamic outer covering of duct 107, and that define an opening that extends through duct 107. As shown, hub 119 is located primarily aft of the opening.

Figure 4:
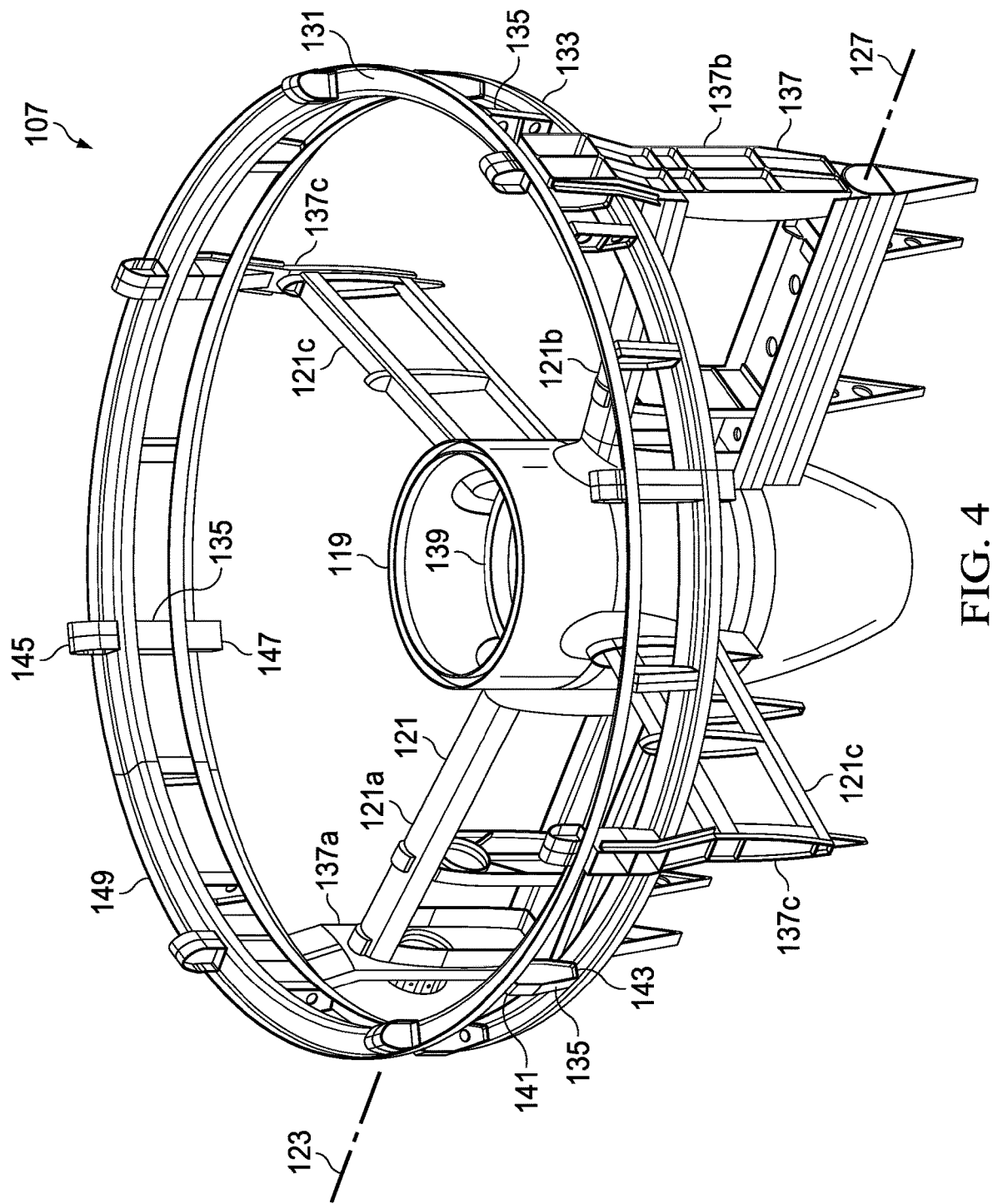
FIG. 4 is an oblique view of the duct depicted in FIG. 3, with an outer skin of the duct removed to illustrate internal components of the duct.

FIG. 4 is an oblique view of duct 107 with aerodynamic exterior skin pieces, including skin 129, removed to illustrate inner components of duct 107. Duct 107 has a structural framework comprised of structural members. Included among structural members of duct 107 are hub 119, stators 121, an annular forward spar 131, an annular aft spar 133, a plurality of ribs 135, a plurality of fittings 137, and an inner hub assembly 139. Hub assembly 139 is configured for the attachment of a motor (not shown) thereto that drives rotor 109, and configured to facilitate the attachment thereto of other components of duct 107, such as stators 121, mechanisms for adjusting rotor pitch of blades 111, and so on.

Each rib 135 defines an upper end 141 and an opposed lower end 143. The upper end 141 of each rib 135 is configured to attach to forward spar 131, and the lower end 143 of each rib 135 is configured to attach to aft spar 133. As shown, ribs 135 may be configured with differing geometries relative to each other. For example, certain ones of ribs 135 may define one or more apertures that extend therethrough. It should be appreciated that duct 107 is not limited to the illustrated configuration of ribs 135. For example, duct 107 may be implemented with more or fewer ribs and/or with ribs having the same or different geometries as compared to ribs 135.

In this embodiment, duct 107 includes four fittings 137. Each fitting 137 is configured to couple to a second end of a corresponding stator 121. More specifically, duct 107 includes an inboard primary stator fitting 137a that is couplable to a second end of inboard primary stator 121a, an outboard primary stator fitting 137b that is couplable to a second end of outboard primary stator 121b, and two secondary stator fittings 137c that are couplable to respective second ends of secondary stators 121c. The opposed first end of each stator 121 is configured to be coupled to hub assembly 139.

In this embodiment, the structural members of duct 107 further include upper braces 145 and lower braces 147. Upper braces 145 are attached to forward spar 131 and are configured to support corresponding portions of skin 129. As shown, duct 107 includes eight upper braces 145 that are equally spaced apart around forward spar 131, attached to forward spar 131 at locations above every fitting 137 and at midpoints between adjacent fittings 137. Lower braces 147 are attached to aft spar 133 and are configured to support corresponding portions of skin 129. As shown, duct 107 includes four lower braces 147 that are spaced apart around aft spar 133, attached below corresponding upper braces 145. As shown, ribs 135 that are disposed between an upper brace 145 and a lower brace 147 may be wider than others of the plurality of ribs 135.

When assembled, as shown in FIG. 4, forward spar 131, aft spar 133, ribs 135, fittings 137, upper braces 145, and lower braces 147 together comprise a first structural portion of duct 107 that defines a duct ring 149 of duct 107. Duct ring 149 further includes one or more sections of skin 129. As shown, duct ring 149 surrounds a portion of hub 119 and defines a passage through which air moves through duct ring 149. Hub 119, stators 121, and control vane 125 together comprise a second structural portion of duct 107 that supports a motor (not shown) and rotor 109.

When ducts 107 of aircraft 101 are positioned as shown in FIG. 2 with blades 111 of rotors 109 rotating, air will move into the duct rings 149 of ducts 107 past forward spars 131 as rotors 109 generate thrust that causes aircraft 101 to move in a forward direction. As air moves through ducts 107 while blades 111 of rotors 109 are rotating, the air will move past aft spars 133 and be exhausted over control vanes 125 and away from ducts 107, for example in an aft direction as aircraft 101 moves in a forward direction. In this regard, control vanes 125 are mounted aft of blades 111 of rotors 109.

One or both of forward spar 131 and aft spar 133 may be constructed of composite material. In the instant disclosure, composite material preferably refers to plies of a fiber-reinforced plastic (FRP) composition that includes filament fibers, such as carbon fibers for example, embedded in a thermoset polymer matrix material such as a thermoplastic resin. Preferably the fibers within the plies are woven and the plies are pre-impregnated with resin. To illustrate, forward spar 131 and aft spar 133 may be constructed from one or more layered plies of carbon-fiber-reinforced plastic (CFRP). It should be appreciated that duct 107 is not limited to an implementation having two spars such as forward spar 131 and aft spar 133. For example, duct 107 may be alternatively implemented with more or fewer spars.

Figure 5A:
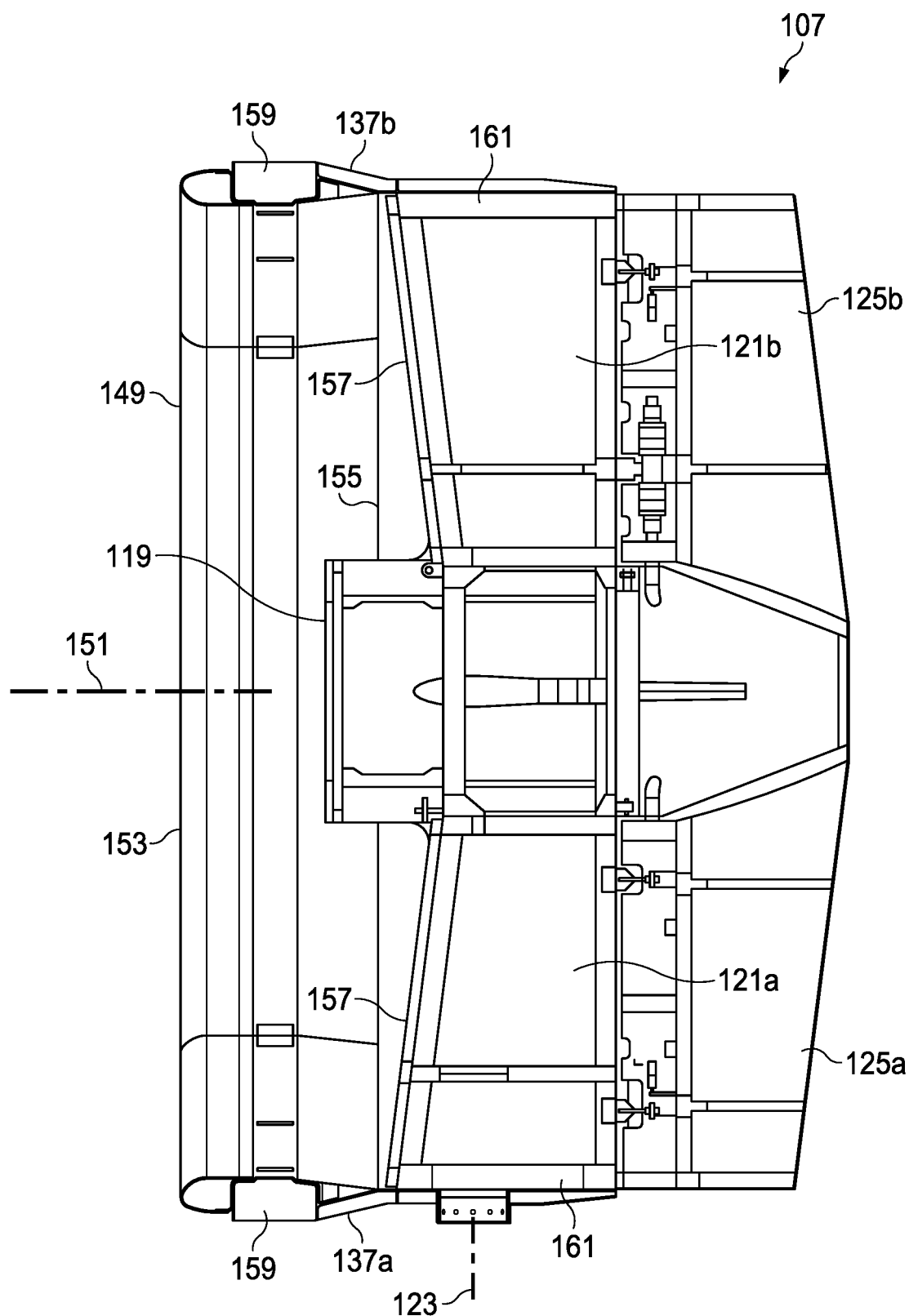
FIG. 5A is a first cross-sectional view of the duct depicted in FIG. 3.
Figure 5B:
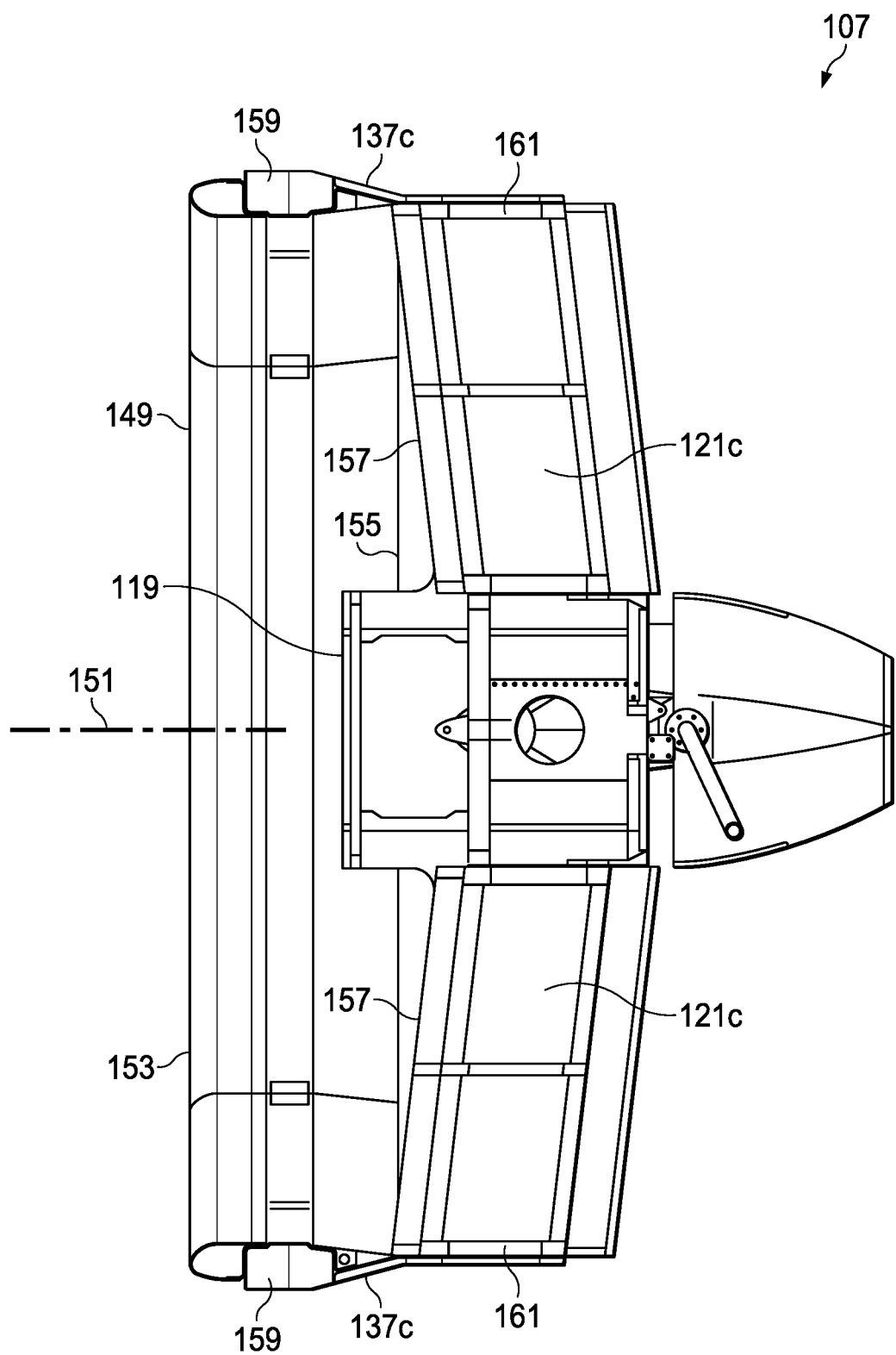
FIG. 5B is a first cross-sectional view of the duct depicted in FIG. 3.

FIG. 5A is a cross-sectional view of duct 107, taken along a plane that extends parallel to a longitudinal midline of inboard primary stator 121a and outboard primary stator 121b and extends parallel to a central duct axis 151 about which rotor 109 rotates. FIG. 5B is a cross-sectional view of duct 107, taken along a plane that extends parallel to a longitudinal midline of secondary stators 121c and extends parallel to central duct axis 151. Duct ring 149 defines a circumferential leading edge 153 and a circumferential trailing edge 155. Each stator 121 defines a leading edge 157. It should be appreciated that leading edges 157 of stators 121 are not limited to the illustrated slanted configuration. For example, leading edges 157 of stators 121 may be alternatively configured with any other suitable geometry.

In this embodiment, duct 107 includes inboard primary stator fitting 137a, outboard primary stator fitting 137b, and a pair of secondary stator fittings 137c. Inboard primary stator fitting 137a, outboard primary stator fitting 137b, and secondary stator fittings 137c may be referred to as a system of fittings for installation in duct 107. Inboard primary stator fitting 137a and outboard primary stator fitting 137b may be referred to as first and second fittings of the system of fittings and secondary stator fittings 137c may be referred to as third and fourth fittings of the system of fittings.

As shown, each fitting 137 includes a first attachment interface 159 that is configured to couple to structure of duct ring 149 and a second attachment interface 161 that is configured to couple to a corresponding stator 121 of duct 107. For each fitting 137, first attachment interface 159 is spaced from second attachment interface 161 such that when fitting 137 is coupled to duct ring 149 and a corresponding stator 121, all or substantially all of stator 121 is located aft of trailing edge 155 of duct ring 149. It was observed that locating all or substantially all of stators 121 aft of trailing edge 155 of duct ring 149, thereby increasing a distance between blades 111 of rotor 109 and leading edges 157 of stators 121, decreases noise and increases vibrational stability of ducts 107.

For example, as shown in FIG. 5A, first attachment interface 159 of inboard primary stator fitting 137a is spaced from second attachment interface 161 thereof such that when inboard primary stator fitting 137a is coupled to duct ring 149 and inboard primary stator 121a, all of inboard primary stator 121a is located aft of trailing edge 155 of the duct ring 149. Similarly, first attachment interface 159 of outboard primary stator fitting 137b is spaced from second attachment interface 161 thereof such that when outboard primary stator fitting 137b is coupled to duct ring 149 and inboard primary stator 121a, all of outboard primary stator 121b is located aft of trailing edge 155 of the duct ring 149. Additionally, as shown in FIG. 5B, for each of secondary stator fittings 137c, first attachment interface 159 is spaced from second attachment interface 161 such that when secondary stator fitting 137c is coupled to duct ring 149 and a corresponding secondary stator 121c, substantially all of secondary stator 121c is located aft of trailing edge 155 of the duct ring 149. As shown, when fittings 137 are installed in duct 107, second attachment interfaces 161 are located radially inward from first attachment interfaces 159, relative to central duct axis 151. It should be appreciated that while the illustrated configurations of fittings 137 cause all or substantially all of each of stators 121 to be located aft of trailing edge 155 of duct ring 149, fittings 137 may be alternatively configured to position one or more stators 121 in other locations relative to duct ring 149.

Figure 6A:
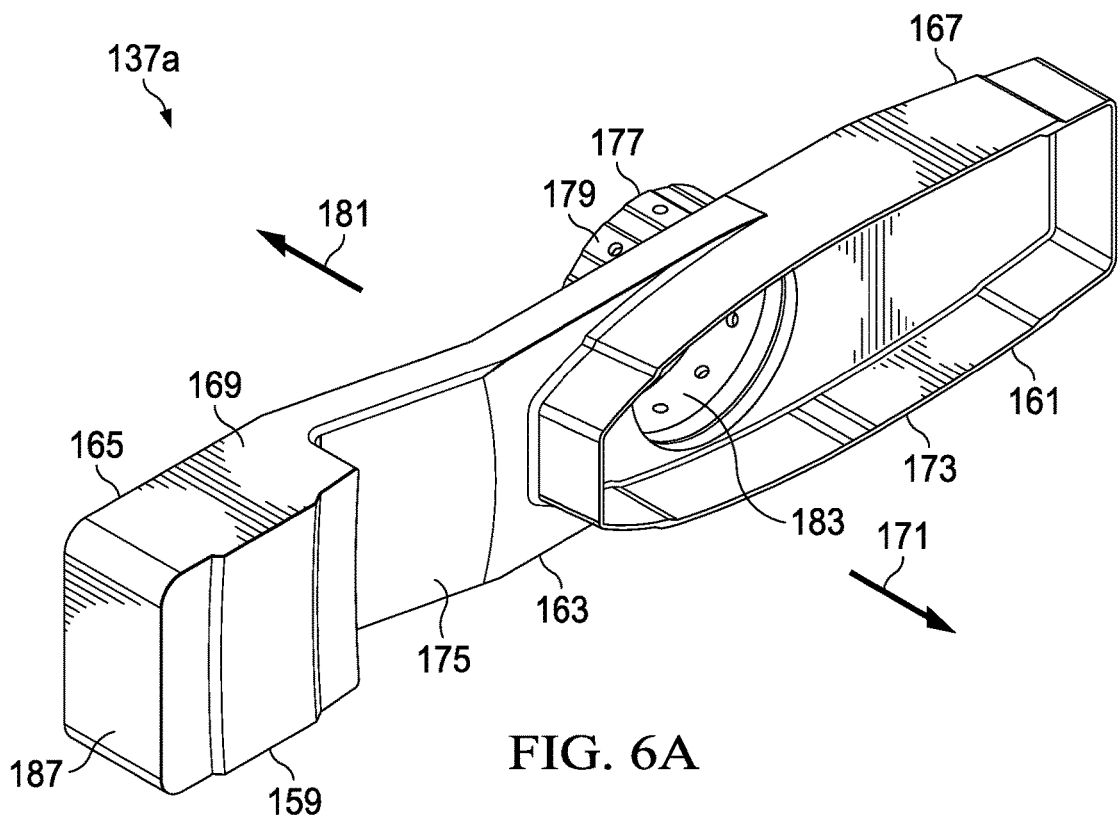
FIG. 6A is a first oblique view of a fitting component of the duct depicted in FIG. 3.
Figure 6B:
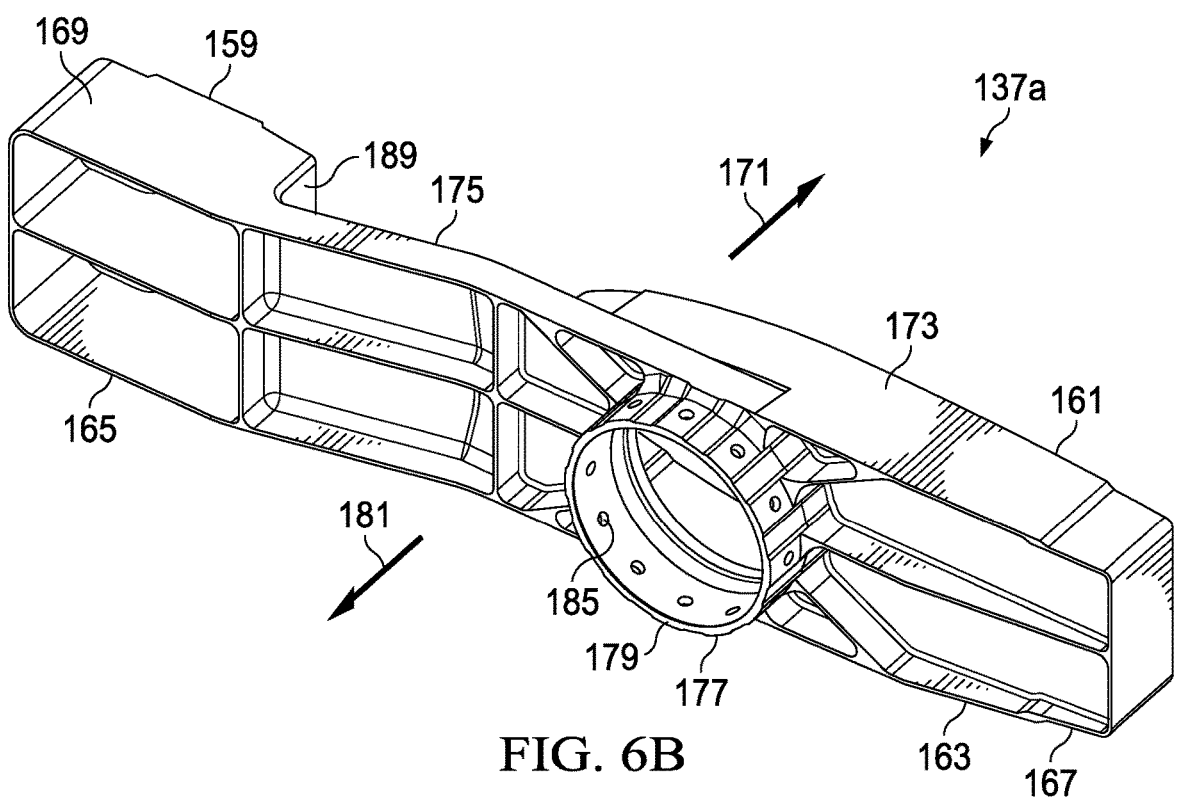
FIG. 6B is a second oblique view of the fitting component depicted in FIG. 6A.

FIGS. 6A and 6B are oblique views of inboard primary stator fitting 137a. Inboard primary stator fitting 137a is configured to be couplable to a second end of inboard primary stator 121a. Inboard primary stator fitting 137a includes a body 163 that is elongate between a first end 165 and an opposed second end 167. Body 163 defines first attachment interface 159 that is configured to couple to structure of duct ring 149 and second attachment interface 161 that is configured to couple to a second end of inboard primary stator 121a of duct 107. In this embodiment, first attachment interface 159 is located at first end 165 of body 163 and second attachment interface 161 is located at second end 167 of body 163. As shown, first attachment interface 159 comprises a protrusion 169 that extends outward from body 163 along a first direction 171. It should be appreciated that protrusion 169 is not limited to the illustrated geometry, and more generally that first attachment interface 159 is not limited to a protrusion. Second attachment interface 161 comprises an insert 173 that extends outward from body 163 along first direction 171. As shown, insert 173 is implemented as a flanged insert that is configured to be received in a second end of inboard primary stator fitting 137a. It should be appreciated that insert 173 is not limited to a flanged insert or to an insert having the illustrated geometry, and more generally that second attachment interface 161 is not limited to an insert.

Body 163 further defines a neck 175 that extends from first attachment interface 159 to second attachment interface 161. As shown, neck 175 is angled relative to first attachment interface 159 and second attachment interface 161. In this embodiment, first attachment interface 159 is spaced apart from second attachment interface 161 by neck 175.

Body 163 of inboard primary stator fitting 137a further defines a third attachment interface 177 that is configured to at least partially receive a spindle of aircraft 101, such as spindle 113 or 115. As shown, third attachment interface 177 comprises a tubular collar 179 that extends outward from body 163 along a second direction 181 that is opposite first direction 171. Collar 179 defines an aperture 183 that extends through body 163. As shown, aperture 183 opens to an interior of insert 173. Aperture 183 is configured to receive a portion of spindle 113 or 115. Collar 179 may be configured to be mechanically fastened to spindle 113 and/or 115. For example, in this embodiment collar 179 has a plurality of apertures 185 that extend therethrough. Apertures 185 may be aligned with a complementary plurality of apertures of spindle 113 or 115 such that fasteners, for instance bolts, may be installed into the pluralities of apertures to removably secure duct 107 to spindle 113 and/or 115. It should be appreciated that collar 179 is not limited to the illustrated geometry, and more generally that third attachment interface 177 is not limited to a collar.

Figure 7:
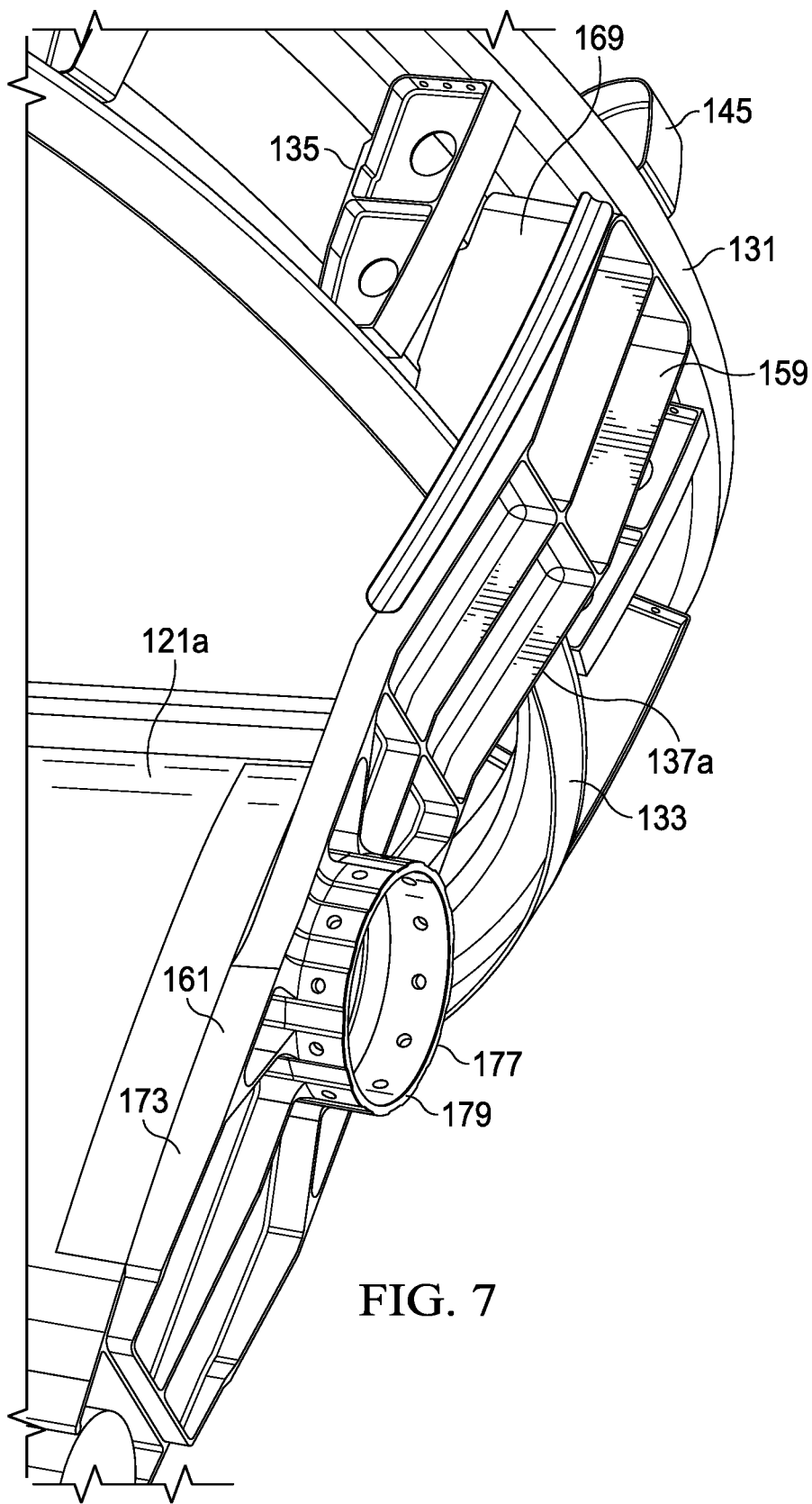
FIG. 7 is an oblique view of a portion of the duct depicted in FIG. 3, illustrating the fitting depicted in FIGS. 6A and 6B in an installed position in the duct.
Figure 8:
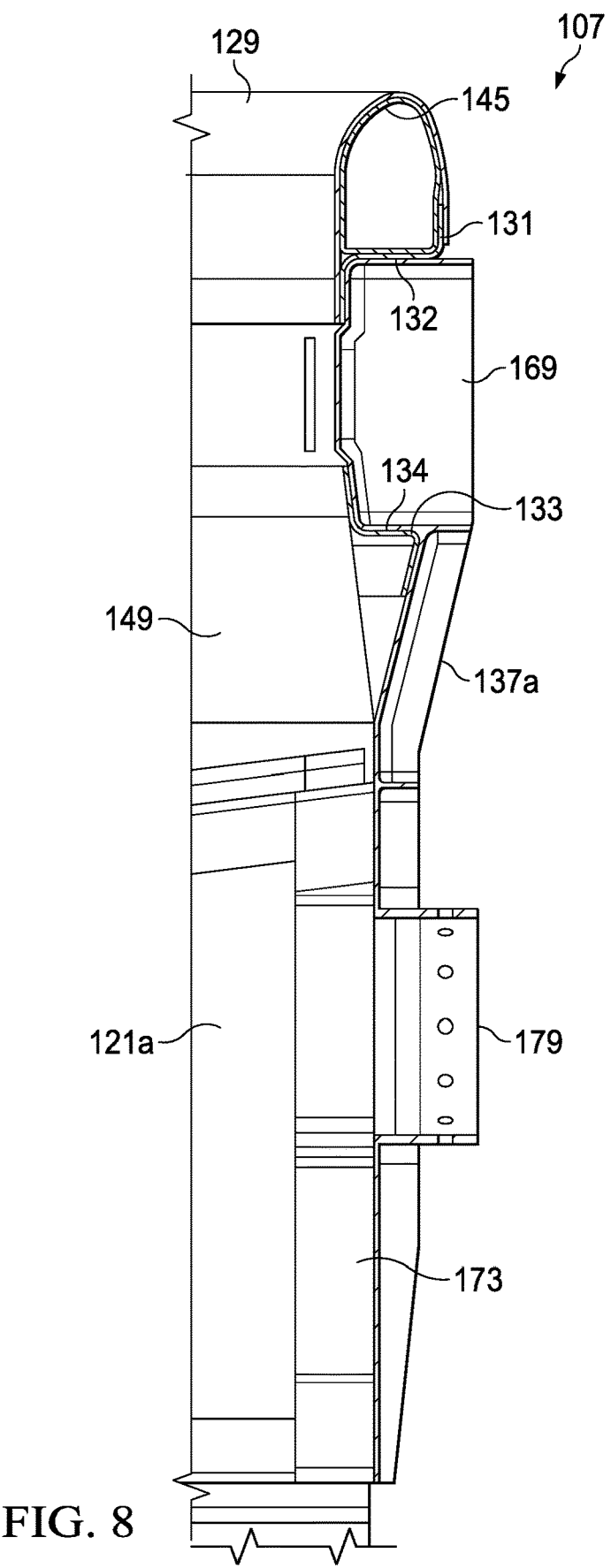
FIG. 8 is a cross-sectional view of the fitting depicted in FIGS. 6A and 6B, with the fitting in the installed position illustrated in FIG. 7.

FIG. 7 is an oblique view of a portion of duct 107, illustrating inboard primary stator fitting 137a in an installed position in duct 107. FIG. 8 is a cross-sectional oblique view of inboard primary stator fitting 137a installed in duct 107. In this embodiment, protrusion 169 is configured to be coupled to duct ring 149. More specifically, protrusion 169 defines a first surface 187 (as shown in FIG. 6A) that is configured to abut a lower surface 132 of forward spar 131 when protrusion 169 is disposed between forward spar 131 and aft spar 133 and a second surface 189 (as shown in FIG. 6B) that is configured to abut an upper surface 134 of aft spar 133 when protrusion 169 is disposed between forward spar 131 and aft spar 133. Inboard primary stator fitting 137a may be installed in duct ring 149, and thus in duct 107, by disposing protrusion 169 between forward spar 131 and aft spar 133 and securing one or both of forward spar 131 and aft spar 133 to protrusion 169, for example using fasteners. Additionally, in this embodiment insert 173 is configured to be disposed into a second end of inboard primary stator 121a and secured to inboard primary stator 121a, for example using fasteners.

Figure 9:
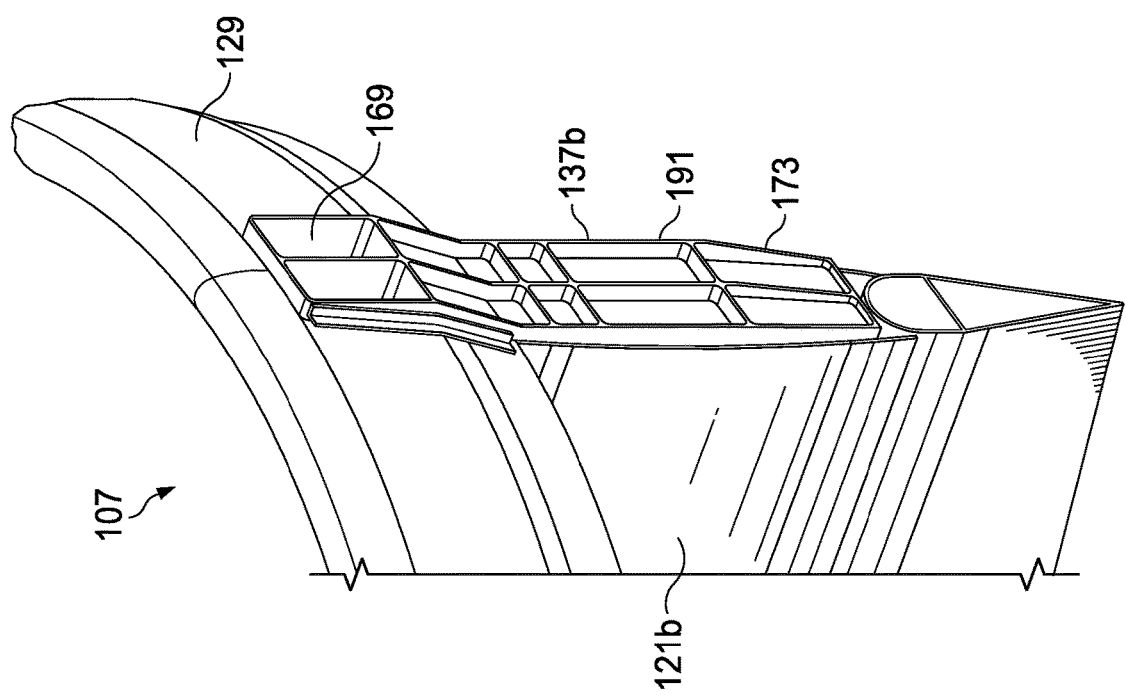
FIG. 9 is an oblique view of another fitting component of the duct depicted in FIG. 3, illustrating the fitting in an installed position in the duct.

FIG. 9 is an oblique view of a portion of duct 107, illustrating outboard primary stator fitting 137b in an installed position in duct 107. In this embodiment, outboard primary stator fitting 137b includes a body 191 that is configured similarly to body 163 of inboard primary stator fitting 137a, omitting third attachment interface 177. More specifically, body 191 of outboard primary stator fitting 137b defines a protrusion 169 that matches that of inboard primary stator fitting 137a and is configured to be similarly coupled to duct ring 149. Body 191 further defines an insert 173 that matches that of inboard primary stator fitting 137a and is configured to be disposed into a second end of outboard primary stator 121b and similarly secured to outboard primary stator 121b.

Figure 10:
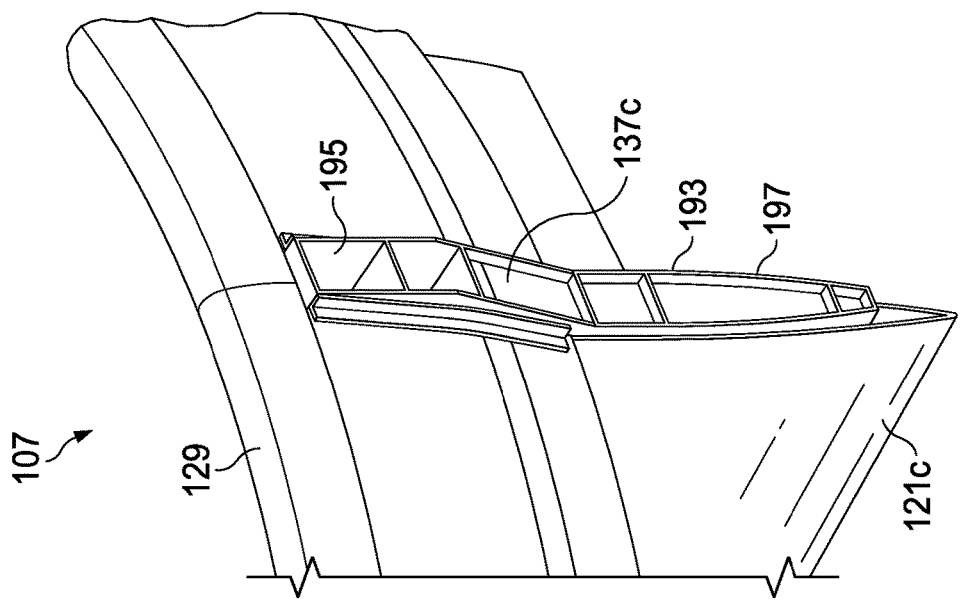
FIG. 10 is an oblique view of still another fitting component of the duct depicted in FIG. 3, illustrating the fitting in an installed position in the duct.

FIG. 10 is an oblique view of a portion of duct 107, illustrating secondary stator fitting 137c in an installed position in duct 107. In this embodiment, secondary stator fitting 137c includes a body 193. As shown, body 193 defines a first attachment interface 195 that is configured to be coupled to duct ring 149. Like inboard primary stator fitting 137a and outboard primary stator fitting 137b, first attachment interface 195 comprises a protrusion (not shown) that defines first and second surfaces that are configured to abut corresponding surfaces of forward spar 131 and aft spar 133 when disposed between forward spar 131 and aft spar 133, and that is configured to be secured to one or both of forward spar 131 and aft spar 133, for example using fasteners. Body 193 further defines a second attachment interface 197 that is configured to be coupled to a corresponding secondary stator 121c. And like inboard primary stator fitting 137a and outboard primary stator fitting 137b, second attachment interface 197 comprises an insert (not shown) that is configured to be disposed into a second end of a secondary stator 121c and secured to secondary stator 121c, for example using fasteners.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. In a duct for a ducted-rotor aircraft, a fitting for coupling a duct ring to a stator, the fitting comprising:
    a body that defines:
        a first attachment interface that couples to structure of the duct ring;
        a second attachment interface that couples to the stator; and
        a third attachment interface that is configured to at least partially receive a spindle that is rotatably couplable to a fuselage of the aircraft;
    wherein the first attachment interface is spaced from the second attachment interface and from the third attachment interface, such that when the fitting is coupled to the duct ring and the stator, both the third attachment interface and all or substantially all of the stator is located downstream of a trailing edge of the duct ring relative to airflow through the duct ring.

2. The fitting of claim 1, wherein the first attachment interface is located at a first end of the body and the second attachment interface is located at an opposed second end of the body.

3. The fitting of claim 2, wherein the first attachment interface comprises a protrusion that extends along a first direction, the protrusion configured to be coupled between first and second annular spars of the duct.

4. The fitting of claim 2, wherein the second attachment interface comprises an insert that extends along a first direction, the insert configured to be received in an end of the stator.

5. The fitting of claim 4, wherein the third attachment interface comprises a tubular collar that extends along a second direction that is opposite the first direction, the collar defining an aperture that extends through the body, the aperture configured to receive a portion of the spindle.

6. The fitting of claim 5, wherein the aperture opens to an interior of the insert.

7. The fitting of claim 1, wherein the body further defines:
    a neck that extends from the first attachment interface to the second attachment interface.

8. The fitting of claim 1, wherein the second attachment interface is located radially inward from the first attachment interface, relative to a central axis of the duct, when the fitting is installed in the duct.

9. In a duct for a ducted-rotor aircraft, a system of fittings for coupling a duct ring to a pair of primary stators and a pair of secondary stators, the system of fittings comprising:
    first and second fittings, each of the first and second fittings configured to be coupled to the duct ring and to a respective primary stator of the pair; and
    third and fourth fittings, each of the third and fourth fittings configured to be coupled to the duct ring and to a respective secondary stator of the pair;
    wherein each of the first, second, third, and fourth fittings defines:
        a first attachment interface that is configured to couple to structure of the duct ring; and
        a second attachment interface that is configured to couple to a primary stator or to a secondary stator
    wherein the first and second fittings are configured to couple to the duct ring and the primary stators such that the primary stators are located downstream of a trailing edge of the duct ring relative to airflow through the duct ring;
    wherein the third and fourth fittings are configured to couple to the duct ring and the secondary stators such that substantially all of the secondary stators are located downstream of the trailing edge of the duct ring; and
    wherein the first fitting is further configured to receive downstream of the trailing edge of the duct ring a portion of a spindle that is rotatably couplable to a fuselage of the aircraft.

10. The system of fittings of claim 9, wherein the first attachment interface comprises a protrusion configured to be coupled between first and second annular spars of the duct, and wherein the second attachment interface comprises an insert configured to be received in a corresponding primary stator or secondary stator.

11. A duct for a ducted-rotor aircraft, the duct comprising:
a hub that is configured to support a rotor;
a duct ring that defines a trailing edge;
a plurality of stators that extend radially outward from the hub; and
a plurality of fittings, each of the plurality of fittings configured to couple a corresponding one of the plurality of stators to the duct ring;
wherein each of the plurality of fittings defines:
- a first attachment interface that is configured to couple to structure of the duct ring; and
- a second attachment interface that is configured to couple to a corresponding one of the plurality of stators;

wherein each of the plurality of fittings is further configured to couple to the duct ring and to a corresponding one of the plurality of stators such that all or substantially all of each of the plurality of stators are located downstream of the trailing edge of the duct ring relative to airflow through the duct ring; and
wherein one of the plurality of fittings further defines:
- a third attachment interface that is configured to at least partially receive downstream of the trailing edge a spindle that is rotatably couplable to a fuselage of the aircraft.

12. The duct of claim 11, wherein the structure of the duct ring comprises first and second annular spars, wherein the first attachment interface comprises a protrusion configured to be coupled between the first and second spars, and wherein the second attachment interface comprises an insert configured to be received in a corresponding one of the plurality of stators.

13. The duct of claim 11, wherein each of the plurality of fittings further defines a neck that extends from the first attachment interface to the second attachment interface.

* * * * *